United States Patent [19]

Tadokoro et al.

[11] Patent Number: 4,965,785
[45] Date of Patent: Oct. 23, 1990

[54] OPTICAL HEAD INCLUDING A COLLIMATOR HAVING LENSES OF DIFFERENT FOCAL LENGTHS

[75] Inventors: Michihiro Tadokoro; Kazuo Okada, both of Hyogo, Japan

[73] Assignee: Mitsubishi Denki Kabushiki Kaisha, Tokyo, Japan

[21] Appl. No.: 217,933

[22] Filed: Jul. 12, 1988

[30] Foreign Application Priority Data

Jul. 14, 1987 [JP]  Japan .................. 62-176304
Jan. 20, 1988 [JP]  Japan .................. 63-11254

[51] Int. Cl.$^5$ .............................................. G11B 7/12
[52] U.S. Cl. ................... 369/112; 369/44.23
[58] Field of Search ................ 369/112, 43–47, 369/44.23; 350/479, 480; 346/76 L, 135.1; 365/113

[56] References Cited

U.S. PATENT DOCUMENTS 4,521,680  6/1985  Ando ............................ 250/201
4,823,334  4/1989  Tanaka et al. .................. 369/112

FOREIGN PATENT DOCUMENTS 0171816  8/1985  European Pat. Off. .

OTHER PUBLICATIONS

Japanese Patent Public Disclosure (Kokai), Nos. 61-210541 and 62-12934.

Primary Examiner—Robert L. Richardson
Attorney, Agent, or Firm—Wolf, Greenfield & Sacks

[57] ABSTRACT

Provided is an optical recording and reproducing apparatus in which a collimator lens collimates divergent light fluxes from a light source to emit parallel light fluxes and then an objective lens converges the parallel light fluxes onto an information carrier. The collimator lens comprises a first lens having a first predetermined focal distance and a second lens having a second predetermined focal distance which is longer than the first predetermined focal distance. The second lens can be moved in the optical-axis direction so as to adjust the relative position of the collimator lens and the light source.

8 Claims, 5 Drawing Sheets

OPTICAL HEAD INCLUDING A COLLIMATOR HAVING LENSES OF DIFFERENT FOCAL LENGTHS

FIELD OF THE INVENTION

The present invention relates to an optical recording and reproducing apparatus in which the relative position of a light source and a collimator lens can be adjusted.

DESCRIPTION OF THE RELATED BACKGROUND ART

FIG. 1 is a perspective view showing an optical path of a conventional optical recording and reproducing apparatus of the type disclosed in, e.g., JP-A-61-210541. In the diagram reference numeral 1 denotes a light source which may be a semiconductor laser; reference numeral 2 denotes a collimator lens; 3 is a light flux shaping prism for shaping parallel light fluxes; 4 a polarizing beam splitter; 5 a reflecting mirror; and 6 a ¼ wavelength plate. In this embodiment, the elements 3 to 6 are integrally attached to each other. Reference numeral 7 denotes an objective lens and 8 indicates an information carrier. Only a part of the information carrier 8 is illustrated in the diagram. Reference numeral 8a denotes a recording film formed in the information carrier 8a; 9 is a convex lens; 10 a half prism; 11 a two-split type photodetector for detecting any error in the track position; 12 a knife edge for shutting out a part of the light fluxes; 13 is a two-split type photodetector for detecting any error in the focal point; 14 parallel light fluxes which are transmitted from the collimator lens 2; 15 light fluxes transmit- ted from the light flux shaping prism 3; 16 the rotational center of the information carrier 8; and 17 reflected light fluxes transmitted from the polarizing beam splitter 4.

The operation will now be explained. The divergent bundle of rays emitted from the semiconductor laser 1 are converted into almost parallel light fluxes 14 by the collimator lens 2. The parallel light fluxes 14 enter the prism 3 and are magnified in one direction which is perpendicular to the optical axis of the parallel light fluxes 14 and become the light fluxes 15.

The above constitution will now be further described in detail with reference to FIG. 2. In the diagram, the light flux shaping prism 3 magnifies only those light fluxes which are travelling in the direction parallel to the paper surface relative to FIG. 2. Namely, the parallel light fluxes 14 transmitted from the collimator lens 2 are magnified since the light fluxes corresponding to light flux diameter h in the direction parallel to the paper surface pass through the prism 3, whereby the light fluxes 15 having a light flux diameter H are obtained. The light fluxes 15 pass through the polarizing beam splitter 4, are reflected by the reflecting mirror 5, and pass through the ¼ wavelength plate 6. Then the light fluxes are focused by the objective lens 7 to form very small light spot on the recording film 8a of the information carrier 8. The light reflected from the information carrier 8 passes through the objective lens 7 and ¼ wavelength plate 6 and is reflected by the reflecting mirror 5. Then the reflected light is reflected by the polarizing beam splitter 4 and becomes reflected light fluxes 17. The reflected light fluxes 17 are converged by the convex lens 9. Almost half of the light amount of the light fluxes converged by the convex lens 9 is transmitted through the half prism 10 and enters the two-split type photodetector 11 to detect any error in the track position. The photodetector 11 is arranged at a position away from the focal point of the convex lens 9. The other half of the light amount of the light fluxes converged by the convex lens 9 is reflected by the half prism 10. Almost half of these light fluxes are shut off by the knife edge 12 and then they enter the two-split type photodetector 13 to detect any error in the focal point.

The photodetector 13 is disposed on the focal point of the convex lens 9.

A track position error signal is obtained from the difference between output signals of the photodetector 11. A focal point error signal is derived from the difference between output signals of the photodetector 13. These error signals are input to a control circuit (not shown). An output of the control circuit is input to an actuator (not shown) to drive the objective lens 7. The actuator drives the objective lens 7 in the direction of the focal point, i.e., in the direction of an optical axis (indicated by an arrow F in FIG. 1) and in the radial direction (indicated by an arrow T in FIG. 1) of the information carrier 8. When the information carrier 8 rotates around the rotational center 16, the tracking control which allows the light spot to follow the eccentricity of the information carrier 8 and the focusing control which allows the light spot to follow the surface oscillation of the information carrier 8 are executed. On the other hand, the reproduction signal which is designed to reproduce the information recorded on the information carrier 8 can be obtained from the sum of the output signals of the photodetector 11.

As mentioned above, according to the conventional optical recording and reproducing apparatus, the parallel light fluxes emitted from the collimator lens are magnified in one direction by the light flux shaping prism. In this case, if the relative position of the semiconductor laser and collimator lens is caused to deviate due to an initial adjustment error or the like, the light fluxes which enter the light flux shaping prism may become convergent light fluxes which are slightly converged or divergent light fluxes which slightly diverge, though they are inherently designed to become parallel light fluxes.

As is well known (for instance, refer to JP-A-62-12934), if the light fluxes which enter the light flux shaping prism slightly change to become convergent light fluxes or divergent light fluxes, astigmatism occurs when they pass through the light flux shaping prism, and an astigmatic difference therefore occurs in the light spot which is focused by the objective lens. Thus, there are adverse consequences such as deterioration of the recording characteristics or the like.

Although the allowable amount of any error representative of the relative position of the semiconductor laser and collimator lens varies in accordance with the particular degree of magnification of the optical system concerned, the degree of magnification of the light fluxes, or the like, it must generally be set at about 1 $\mu$m or less. In assembling the conventional apparatus, therefore, in order to realize an adjustment accuracy of 1 $\mu$m, the adjusting mechanism or the fixing method used after adjustment becomes complicated.

On the other hand, the distance between the semiconductor laser 1 and the collimator lens 2 generally shows a dimension of about 10 mm due to disturbances that occur during operation of the apparatus. Therefore, in the case of using an ordinary material, e.g., aluminum or the like, the distance between the semiconductor laser 1 and the collimator lens 2 may change by 5 to 6 μm in response to a change in temperature of 25° C. Accordingly, it is necessary to take some countermeasures to suppress the potential change in this distance to about 1 μm or less.

According to JP-A-62-12934 which represents one example of the countermeasures that can be taken, an actuator may be attached to a collimator lens and, by driving the actuator, the collimator lens is moved in the direction of the optical axis. This conventional system will be explained with reference to FIG. 3. In the diagram, reference numeral 200 denotes an actuator adapted to move the collimator lens in the optical axis direction. The actuator 200 may be of the vois coil type or similar.

The operation will now be explained with reference to the diagram which shows an example. By detecting the temperature, a change in the relative distance between the semiconductor laser 1 and the collimator lens 2 can be obtained. The actuator 200 is driven to move the collimator lens 2 in the optical axis direction, thereby compensating for the change in temperature. In such cases, however, an adjusting accuracy of about 1 μm is required as the adjusting accuracy of the collimator lens 2 mentioned above. Consequently, a servo operation may be made inoperative by disturbances such as vibration or shock when the collimator lens 2 is likely to move by a distance on the order of 1 μm or more which will lead to practical problems.

Particularly in the case of optical disks, there is a possibility that the whole optical path system will be moved at high speed in the radial direction of the information carrier when information is retrieved. There is, therefore, always a possibility of disturbance such as vibration occurring.

SUMMARY OF THE INVENTION

The present invention was achieved in order to solve the foregoing problems, and it is an object of the invention to provide an optical recording and reproducing apparatus in which the relative position of the light source and the collimator lens can be easily adjusted.

According to one aspect of an optical recording and reproducing apparatus of the present invention, a collimator lens is divided into two lens elements, one of which is formed as a lens having a long focal distance so that the relative position of the collimator lens and light source can be finely adjusted by utilizing the lens having the long focal distance when the apparatus is assembled.

According to another aspect of the optical recording and reproducing apparatus of the invention, an actuator is made to be operative in response to an output of detecting means for detecting disturbances such as to move the collimator lens having the relatively long focal distance.

According to yet another aspect of the optical recording and reproducing apparatus of the invention, by moving the lens having the relatively long focal distance in the optical axis direction, the focal distance of the whole collimator lens is finely changed, and the relative position of the collimator lens and the light source can thus be finely adjusted during assembly.

According to a further aspect of the optical recording and reproducing apparatus of the invention, the lens having the relatively long focal distance is moved by the actuator in response to any disturbance which is detected by the detecting means, thereby allowing the relative position of the collimator lens and the light source to be finely adjusted at all times.

According to a still further aspect of the present invention, the collimator lens is divided into two lens elements, one of which has a relatively long focal distance and can be adjusted in the optical axis direction, so that the relative position of the light source and collimator lens can be easily adjusted.

DETAILED DESCRIPTION OF THE PREFERRED EMBODIMENTS

Figure 1:
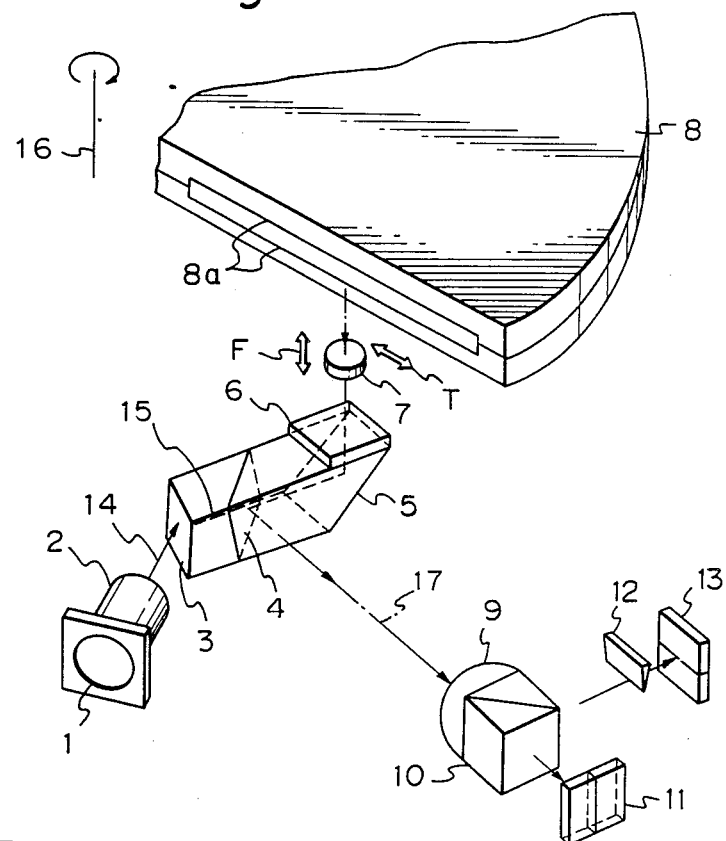
FIG. 1 is a perspective view showing a conventional recording and reproducing apparatus.
Figure 2:
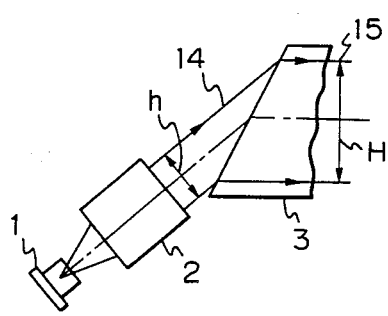
FIG. 2 is an arrangement diagram showing the main section appearing in FIG. 1.
Figure 3:
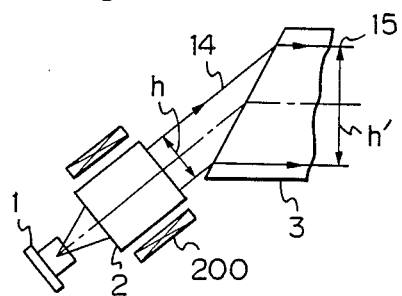
FIG. 3 is an arrangement diagram showing another arrangement of the main section appearing in FIG. 1.
Figure 4:
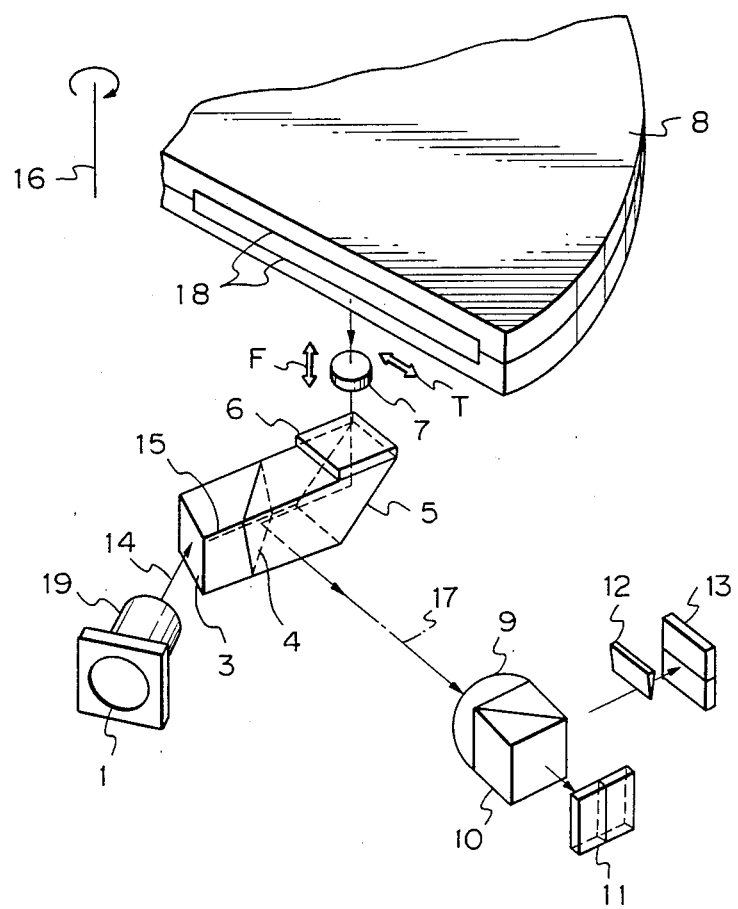
FIG. 4 is a perspective view showing the first embodiment of the invention.
Figure 5:
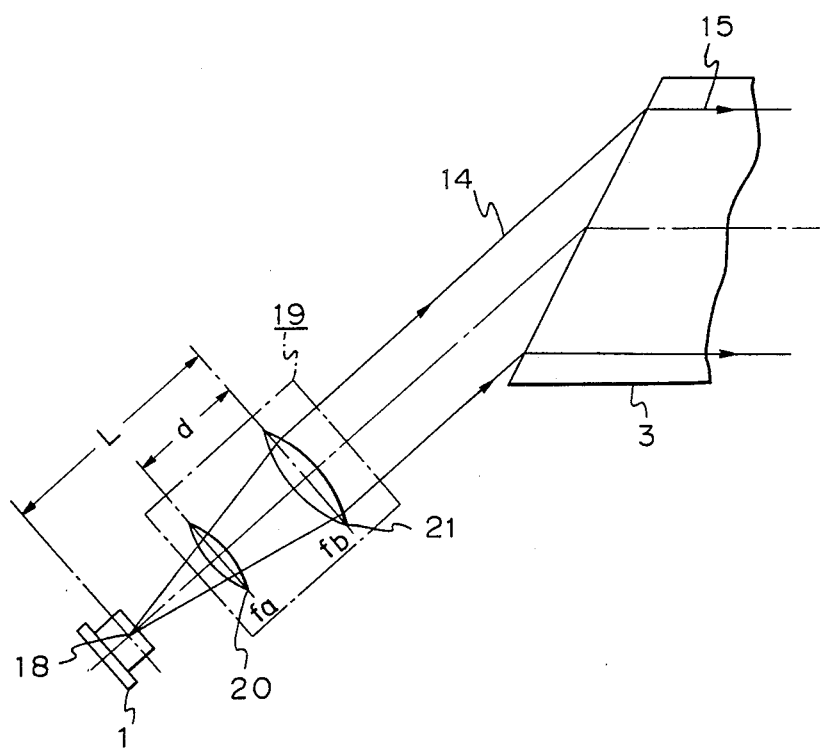
FIG. 5 is an arrangement diagram showing the main section appearing in FIG. 4.

An embodiment of the present invention will be described below with reference to the drawings. In FIGS. 4 and 5, the elements indicated at reference numerals 1 and 3 to 17 are similar to those shown in FIGS. 1 to 3. Reference numeral 18 denotes the light emitting point of the light source 1 and 19 indicates a collimator lens comprising a lens 20 having a relatively long focal distance $f_a$ and a lens 21 having a focal distance $f_b$ which is close to the focal distance produced by combining the lenses 20 and 21. Although the lenses 20 and 21 are shown as two single convex lenses, they may each be constituted as a compound lens, a concave lens, or a convex lens, or any combination thereof. On the other hand, although a designed aberration is necessary in the case of a single collimator lens consisting of two lenses 20 and 21, it suffices when the focal distance of the lens 20 is long enough to design the aberration of the lens 21 alone. The relatively long focal distance specified for the lens 20 represents a distance having a relatively large value in the case where the lens 20 is a convex lens. If the lens 20 is a concave lens, however, the relatively long focal distance represents a distance having a relatively large absolute value.

As shown in FIG. 5, assuming that the distance between the lens 20 having the long focal distance $f_a$ and the lens 21 having the focal distance $f_b$ is d and the distance between the light emitting point 18 of the light source 1 and the lens 21 is L, the positional relationship therebetween in terms of optical geometry is shown by the following equation (1).

$$L = \frac{1 - \frac{d}{f_b}}{\frac{1}{f_a} + \frac{1}{f_b} - \frac{d}{f_a f_b}} + d \tag{1}$$

Now, considering the collimator lens 19 of $f_a = 500$ mm, $f_b = 10$ mm, and $d = 5$ mm, the value of L is equal to 9.9505 mm from the equation (1). In this case, the resultant focal distance of the collimator lens 19 is equal to 9.9010 mm.

Assuming the case where the lens 21 is disposed at the ideal position, namely, away from the light emitting point 18 by the distance L=9.9505 mm, and the lens 20 having the longer focal distance $f_a$ is adjusted in the optical axis direction, thereby adjusting the light fluxes 14 which are emitted from the collimator lens 19. When the lens 20 is at the ideal position, that is, when the distance between the lenses 20 and 21 is adjusted so as to be d=5mm, the value of L=9.9505 mm as obtained from the equation (1), so that the light fluxes 14 become parallel. However, if errors occur in the adjustment and fixing of the lens 20 and $\Delta d=10$ μm, i.e., d=5.010 mm, the value of $(L+\Delta L)=9.9507$ mm from the equation (1). Thus, the light fluxes 14 become slightly divergent light fluxes. It should be noted that even if the positional error of the lens 20 having the longer focal distance $f_a$ is deviated by $\Delta d=10$ μm in the optical axis direction, an error of just $\Delta L=0.2$ μm occurs as the error of the collimator lens 19.

Now, assuming that the lens 21 is deviated from the ideal position by $\Delta L=10$ μm, that is, is located at the position $L'=L+\mu L=9.9605$ mm, the light fluxes 14 which are emitted from the collimator lens 19 become parallel when the lens 20 having the longer focal distance $f_a$ is located at $d'=d+\Delta d=5.535$ mm.

Therefore, in this case, it is effective to set the distance between the lenses 20 and 21 at 5.535 mm by adjusting the lens 20 having the longer focal distance $f_a$ in the optical axis direction.

As described above, assuming that errors occur in this case as well in the adjustment and fixing of the lens 20 such that $d'=d+\Delta d=5.535+0.01$ mm, an error of 10 μm occurs and, since $L'+\Delta L'=9.9607$ mm, an error of $\Delta L'=0.2$ μm occurs [equation (1)].

As explained above, if the lens 21 is deviated from the ideal position with a slight error at the initial position, the light fluxes emitted from the collimator lens 19 can be set to become parallel light fluxes by adjusting the position of the lens 20. It is to be noted that when the error $\Delta d'=10$ μm needs to be considered an error of just $\Delta L'=0.2$ μm occurs as the error of the collimator lens 19.

In other words, the collimator lens 19 is divided into the lens 20 having a longer focal distance and the lens 21 having a focal distance close to that of the collimator lens 19 so that the position of the lens 20 having the longer focal distance can be adjusted in the optical axis direction to allow the emitted light fluxes 14 to be collimated. As a result, the allowable value (i.e., the relaxation amount) in respect of the adjusting accuracy of the lens 20 can be set at a large value. In the foregoing example, it can be enlarged about fifty times ($\Delta d/\Delta L=10$ μm/0.2 μm). By setting the longer focal distance $f_a$ of the lens 20 to a proper value, the relaxation amount $\Delta d/\Delta L$ can be further increased by one digit or more.

Figure 6:
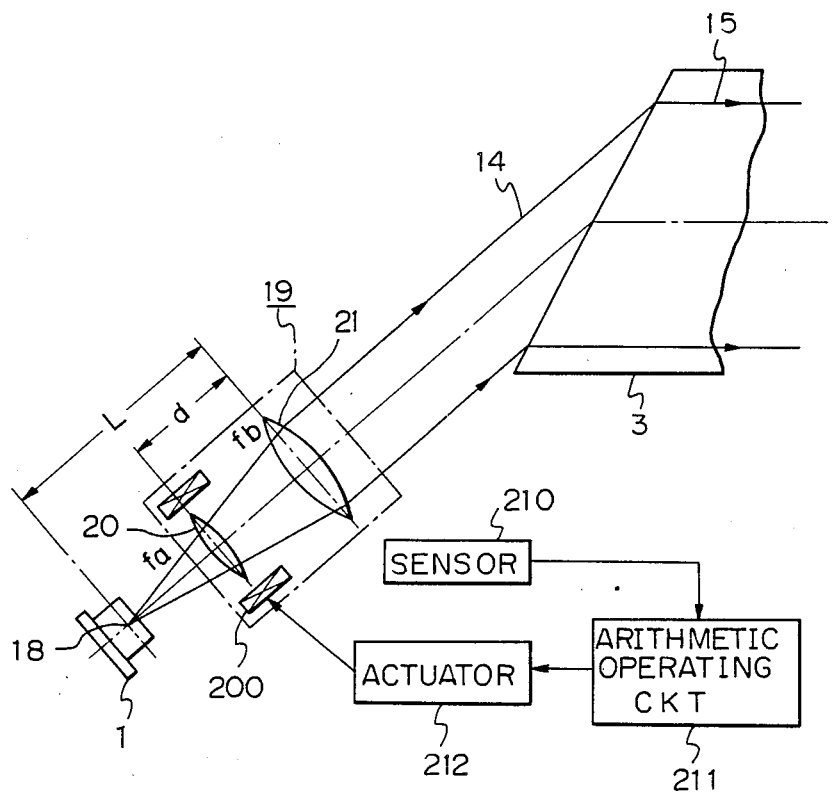
FIG. 6 is an arrangement diagram showing the second embodiment of the invention.

FIG. 6 is an arrangement diagram showing a second embodiment of the invention. In this diagram, the ambient temperature of the semiconductor laser 1 and the collimator lens 21 is detected by a temperature sensor 210. A change in distance between the semiconductor laser 1 and the collimator lens 21 due to any temperature change is obtained by an arithmetic operating circuit 211 in response to a detection signal from the temperature sensor 210. The position of the lens 20 is controlled by driving the actuator 200 through an actuator drive circuit 212 in response to outputs from the arithmetic operating circuit 211.

Figure 7:
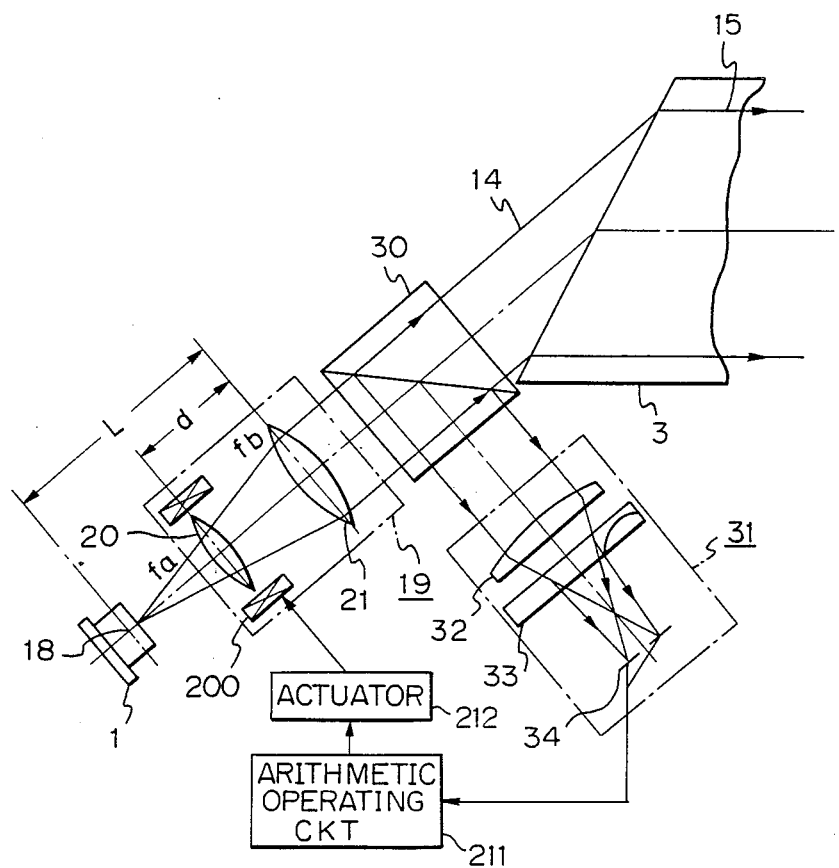
FIG. 7 is an arrangement diagram showing the third embodiment of the invention.

FIG. 7 is an arrangement diagram showing a third embodiment of the invention. Reference numeral 30 denotes prism adapted to separate the parallel light fluxes emitted from the collimator lens 19, and 31 indicates a focal point detecting optical path 31 based on the astigmatism method. The focal point detecting optical path 31 comprises a convex lens 32, a cylindrical concave lens 33, and a 4-split type detector 34.

In the above arrangement, the output of the 4-split type detector 34 is processed by the arithmetic operating circuit 211 to detect any deviation in the distance between the semiconductor laser 1 and the collimator lens 21. By driving the actuator 200 through the actuator drive circuit 212 in response to detecting of any deviation in this distance, the position of the lens 20 can be effectively controlled.

In the above embodiment, the lenses 20 and 21 are each shown as single convex lenses. However, as mentioned above, the lenses 20 and 21 may also be respectively constituted by a plurality of lenses.

On the other hand, it is also possible for the lenses 20 and 21 to be constituted by convex lenses, concave lenses, or a combination thereof.

Further, the positional relationship between the lenses 20 and 21 and light source 1 may be reversed. Namely, the lens 21 can be disposed on the side of the light source 1 and the lens 20 can be arranged on the side remote therefrom.

Although the embodiments have been described as being applied to an optical system for shaping beams, the invention is not limited to this example. The invention can be applied to any type of collimator optical system and will result in the advantage that adjustment can be easily performed.

As described above, according to the present invention, a collimator lens is divided into two lens elements so that the position of the lens having the longer focal distance can be adjusted in the optical axis direction. Therefore, the relative position of the light source and the collimator lens can be easily adjusted.

What is claimed is:

1. An improved optical head for a recording and reproducing apparatus comprising:
    a light source means;
    an objective lens means for focusing parallel light fluxes onto an information carrier means;
    a collimator lens means including a pair of lenses, each having different focal lengths, in optical communication with said light source means and said objective lens means;
    means for spacedly disposing said pair of lenses in an optical-axis direction between said light source means and said objective lens means wherein one lens is closer to and the other lens is more remote from said light source means;
    means for moving one of said pair of lenses in the optical-axis direction to adjust the relative position of said lens to said light source;
    a beam splitter means for separating light fluxes; and
    means for disposing said beam splitter means within said collimated parallel light fluxes between said pair of lenses and said objective lens means.

2. An improved optical head for a recording and reproducing apparatus as set forth in claim 1 further comprising means for detecting changes in the relative position of said pair of lenses to said light source means, and actuation means for moving one of said pair of lenses in the optical-axis direction in response to an output signal from said detecting means.

3. An improved optical head for a recording and reproducing apparatus as set forth in claim 2 wherein said detecting means includes temperature sensing means for detecting the ambient temperature of said light source means and said collimator lens means, and means for producing an output signal to move one of said pair of lenses in response to signal from said temperature sensing means.

4. An improved optical head for a recording and reproducing apparatus as set forth in claim 2 wherein said detecting means includes prism means for separating said parallel light fluxes from said collimator lens means, optical focal point determining means for determining said changes in the relative position of said pair of lenses using light transmitted from said prism means, and means for producing an output signal representative of the changes detected in the relative position of one of said pair of lenses.

5. An improved optical head for a recording and reproducing apparatus as set forth in claim 1 wherein said means for moving moves said closer lens.

6. An improved optical head for a recording and reproducing apparatus as set forth in claim 1 wherein said closer lens to said light source means has a longer focal distance than the focal distance of said more remote lens.

7. An improved optical head for a recording and reproducing apparatus as set forth in claim 1 wherein said beam splitter means is positioned to separate light fluxes reflected from said information carrier means.

8. An improved optical head for a recording and reproducing apparatus as set forth in claim 1 wherein said beam splitter means is positioned to separate collimated light fluxes transmitted from said collimator means.

* * * * *